United States Patent [19]

Smiley et al.

[11] Patent Number: 5,175,036
[45] Date of Patent: Dec. 29, 1992

[54] BARRIER LAMINATES FOR CONTAINMENT OF FLAVOR, ESSENTIAL OILS AND VITAMINS

[75] Inventors: David S. Smiley, Canton; James F. Curtis, Clyde, both of N.C.

[73] Assignee: Champion International Corporation, Stamford, Conn.

[21] Appl. No.: 775,017

[22] Filed: Oct. 11, 1991

[51] Int. Cl.⁵ .................... B32B 27/00; B32B 23/08; B65D 5/56
[52] U.S. Cl. .................... 428/36.7; 428/475.8; 428/476.9; 428/479.3; 428/219; 428/483; 428/513; 428/516; 426/127
[58] Field of Search ............. 428/36.7, 475.8, 476.9, 428/479.3, 483, 513, 516, 219

[56] References Cited

U.S. PATENT DOCUMENTS

| | | | |
|---|---|---|---|
| 4,513,036 | 4/1985 | Thompson et al. | 428/513 |
| 4,935,282 | 6/1990 | Pawlowski et al. | 428/137 |
| 4,948,640 | 8/1990 | Gibbons et al. | 428/513 |
| 5,002,833 | 3/1991 | Kinsey, Jr. et al. | 428/475.8 |

*Primary Examiner*—P. C. Sluby
*Attorney, Agent, or Firm*—Evelyn M. Sommer

[57] ABSTRACT

A laminate providing an effective barrier to migration of essential oils and flavorings and for retention of vitamin C, essential oils and flavor in a juice and cartons made therefrom, wherein the laminate comprises, from the outer surface to the inner surface contacting the juice: an outer polyethylene layer for heat sealing and graphics, a bleached sulfate paperboard substrate, a nylon barrier layer constituting a barrier for oxygen, a first tie layer of modified polyethylene acting as an adherent, another polyethylene layer acting as a heat seal layer and bonded to the nylon barrier layer by the first tie layer, a second tie layer acting as an adherent, and an inner skin layer, which contacts the contents of the carton, which is bonded to the polyethylene layer by the second tie layer, and which may be ethylene vinyl alcohol copolymer (EVOH), polyethylene terephthalate or nylon.

6 Claims, No Drawings

BARRIER LAMINATES FOR CONTAINMENT OF FLAVOR, ESSENTIAL OILS AND VITAMINS

BACKGROUND OF THE INVENTION

This invention relates to barrier laminates for containment of essential oils, flavors and vitamin C in a liquid and for exclusion of oxygen, and to a container for a liquid, particularly a fruit juice, made from those barrier laminates. It also relates to a method of making a barrier laminate of the above described type.

Glass containers have been used for many years to store and transport juice and milk, but have a number of disadvantages including shipping costs for the empty containers, disposal problems, breakage and weight problems. Similarly, blow molded plastic containers for juices and milk are also available, but the empty containers are comparatively expensive to transport and do not prevent loss of vitamin C from a juice product contained in them. In addition manufacturing costs for such all-plastic containers can be prohibitive since expensive equipment is involved in their manufacture.

The advantages of comparatively low container weight, ease of sealing and opening, ease of disposal and low shipping volume for the empty containers (since the containers can be shipped in a collapsed condition), make containers based on a paperboard substrate the current favored choice for marketing juice products and milk. These cartons are known in the trade as "gable top", containers or cartons.

For example, one such carton, or gable-top milk carton, is described in U.S. Pat. No. 3,120,333. Blanks used to make this carton include a paperboard base, which is extrusion coated with resin on both sides. The resin, which may be polyethylene, provides a moisture barrier and means for heat-sealing the carton.

In a typical carton converting operation, once the resin-blanks are scored and cut, the resin on an outer surface of a glue flap and the resin on an inner surface of a carton panel are heated by direct flame application. The carton panels are then folded over to form a flattened tube, the now molten tacky resin on the heated surfaces are pressed together at a downstream nip to form a liquid-tight seam. The cartons, in a flattened tube form, can then be shipped to users such as juice manufacturers or dairies where they are erected, the bottoms heat sealed, filled and their tops finally sealed.

Although considerations of cost make paperboard containers desirable for containing fruit juices and milk, other factors are also important. These involve the choice of a suitable barrier (laminate) for carton construction for retention of flavor and vitamin content during storage. The effect of diffusion of oxygen into the liquid in the container through the barrier laminate and absorption of essential oils from the liquid into the laminate, remain important considerations in the choice of a suitable laminate.

Laminates containing a metal foil have been used to make a foldable paperboard-based carton for a juice product. These metal foil-containing containers do retain the vitamin content and flavors in the juice for a substantial period of time (around ten weeks), but are expensive compared to containers that do not require a metal foil in the laminate from which they are made. Further, metal foil laminates are prone to develop pin holes seriously affecting their ability to contain liquids.

Thus, considerable effort has been devoted to finding the best layer structure in a barrier laminate.

U.S. Pat. No. 4,513,036 describes a laminate useful in making a paperboard-based carton for juices, which does provide an effective barrier to the migration of essential oils and/or flavors, and does not contain a metal foil. This laminate has a paperboard substrate, a layer of polypropylene polymer coated thereon and a polyolefin layer on the polypropylene polymer layer and is heat sealable.

A further advance in the art of making a juice or milk carton resulted from the introduction of a laminate, which also provided an effective barrier for oxygen and thus helped retain vitamin C in the juice stored in a carton made from it. This laminate, which is described in U.S. Pat. No. 4,777,088, comprises from the outer surface to the inner surface, an outer polyolefin coating that provides the heat seal bond, a paperboard substrate that provides the structure of the carton, a nylon layer coated directly on the paperboard substrate, a layer of modified polyethylene (Bynel E 388) directly overlying and in contact with the nylon layer and an inner polyolefin layer in contact with the modified polyethylene layer. Not only does the nylon barrier layer in this laminate help retain vitamin C, but also the laminate helps retain essential oils and flavor as does the laminate of U.S. Pat. No. 4,513,036.

Other barrier laminates capable of excluding oxygen and preventing loss of oils and/or flavors are described in U.S. Pat. Nos. 4,835,025, 4,701,360, 4,861,526, 4,698,246, 4,806,399, 4,977,004, 4,977,009, 4,950,510 and 4,753,832. In U.S. Pat. Nos. 4,701,360, 4,861,526 and 4,698,246 both sides of a paperboard substrate are first flame treated and a layer of low density polyethylene (LDPE) then applied to the outside surface. To the surface of the paperboard which becomes the inside surface of the carton, first, a layer of low density polyethylene is applied directly to the paperboard. Then a nylon barrier layer is applied to that interior low density polyethylene layer with a bonding tie layer between the nylon and polyethylene. Finally, an innermost skin layer is applied to the nylon with another tie layer to improve the adhesion of the layers and to help in heat sealing. This skin layer is ethylene vinyl alcohol polymer. This process is comparatively complicated and involves a substantial number of layers.

SUMMARY OF THE INVENTION

It is an object of the present invention to provide a comparatively economical barrier laminate for juice and/or milk cartons of the above described kind, this barrier laminate having an oxygen barrier layer that protects from oxygen degradation of essential nutrient and vitamin components, particularly Vitamin C, and a skin coating or layer that prevents loss of essential oils and/or flavor.

It is another object of the present invention to provide a comparatively economical barrier laminate for juice and/or milk cartons in which the barrier layer contacts the paperboard substrate directly.

It is a further object of the present invention to provide a beverage carton constructed of a laminate effective to prevent the intrusion of oxygen into the carton and the migration of essential oils and flavors and particularly D-limonene into the polyethylene layer of the laminate.

According to the present invention, the laminate providing an effective barrier to the intrusion of oxygen and migration of essential oils and/or flavorings and for retention of vitamin C, essential oils and flavor in fruit juices comprises, from the paperboard surface to the inner surface contacting the contents of the carton: a paperboard substrate, a nylon barrier layer contacting the paperboard substrate directly, a first tie layer, a polyethylene heat seal layer, a second tie layer, and an inner skin layer, which comes into contact with the fruit juice or contents of the carton made from the laminate. The first tie layer acts to adhere and bond the polyethylene heat seal layer to the nylon layer. The second tie layer adheres and bonds the inner skin layer to the polyethylene heat seal layer.

The skin layer may be advantageously ethylene-vinyl alcohol copolymer (EVOH), however polyethylene terephthalate (PET) or nylon may also be used.

The tie layers are advantageously Bynel E 388 (DuPont) and act as an adherent to bond adjacent layers. However, when PET is used as a skin coat layer, Bynel E 369 (DuPont) is used as the second tie layer. When EVOH or nylon is used as the skin layer, Plexar 175 (Quantum Corporation) may also be used as the second tie layer.

Advantageously the outer surface of the paperboard substrate is provided with a low density polyethylene (LDPE) layer which provides a means for heat sealing the flaps of the cartons made from this laminate.

The laminates of the invention differ from the laminates described in U.S. Pat. Nos. 4,701,360, 4,861,526, and 4,698,246, which also utilize a nylon barrier layer and an EVOH skin layer, because in this instance, the nylon layer is applied directly to the treated paperboard surface. This laminate is simpler and more economical to make ultimately.

In view of the difficulties involved in making a laminate that will heat seal properly, which has a skin layer effective to prevent migration of essential oils and flavors into the heat seal layer and an oxygen barrier layer i.e., nylon which is bonded directly to the substrate without interposition of a tie layer, the laminate of the invention constitutes a marked advance in beverage carton structures.

The comparatively economical laminate of the present invention described above has outstanding oxygen barrier properties. A fruit juice contained in a carton made from this laminate loses no more than 20 to 25% of its vitamin C content in eight weeks. The retention of essential oils by this barrier laminate is also outstanding.

A particularly preferred structure or barrier laminate, comprises from the outermost layer to the innermost layer:

an LDPE outer heat seal applied at about 16 lb per ream,
a bleached sulfate paperboard substrate of about 195 to 280 lb per ream,
a nylon barrier layer of about 5 pounds per ream,
a first tie layer (Bynel E-388 from DuPont) of about 3 to 5 pounds per ream,
a LDPE heat seal layer of about 16 pounds per ream,
a second tie layer (Bynel E-388 from DuPont) of about 3 to 4 pounds per ream, and
a skin layer of about 3 to 4 pounds per ream made from ethylene-vinyl alcohol copolymer.

A method of making the above described laminate includes flame treating a roll of paperboard substrate on both sides. The outside is coated with polyethylene to form the LDPE outer layer of the laminate. The inside is coated with nylon directly, a first tie layer applied and then the LDPE heat seal layer, followed by another tie layer and the innermost skin layer, preferably EVOH copolymer or nylon.

DETAILED DESCRIPTION OF THE PREFERRED EMBODIMENTS

The barrier laminate comprises a plurality of layers.

In particular, the barrier laminate includes a substrate or base layer having a first or interior surface and a second or exterior surface. There is applied directly to the first surface of the substrate, a barrier layer. A first tie layer is applied to the barrier layer, and then a heat seal layer is applied to the first tie layer. Also a second tie layer is applied to the heat seal layer, and a skin coat layer is applied to the second tie layer. The first tie layer is provided to adhere together the barrier layer to the heat seal layer, while the second tie layer is provided to adhere together the skin coat layer to the heat seal layer. An olefin polymer layer, preferably, is applied to the second, exterior surface of the substrate.

The base layer provides the barrier laminate with structure, form, strength and rigidity so that the barrier laminate can be formed into a carton. This base layer is composed of paperboard substrate, preferably a suitable high-grade paperboard. For example, the paperboard substrate could be about 0.010 inches to about 0.028 inches carton stock. In a preferred embodiment, the paperboard is a bleached sulfate paperboard. This material has a coating weight of about one hundred and ninety-five (195) to about two hundred and eighty (280) pounds per ream.

The barrier layer is applied directly onto the base layer and especially functions as a barrier to oxygen. A significant difference in the barrier laminate of the present invention from prior art laminates, is that the barrier layer is applied directly to the paperboard surface. Further, this barrier layer 20 is made of nylon. This barrier layer is responsible for the barrier laminate's effectiveness in preventing the intrusion of oxygen to the inside of the carton or container. This nylon barrier layer has a coating weight of about five (5) pounds per ream.

The first tie layer is positioned immediately adjacent to and between the barrier layer and the heat seal layer to adhere together the barrier layer and the heat seal layer. The first tie layer is applied directly onto the barrier layer after the barrier layer has been directly applied onto the first surface of the paperboard substrate.

The first tie layer, preferably, is made of Bynel E 388. Bynel E 388 a modified polyethylene resin is sold by DuPont. The Bynel E 388 first tie layer has a coating weight of about three (3) to about (5) pounds per ream.

The heat seal layer provides the heat seal bonds that define the structure of the carton. This layer 40 also provides the liquid tight and gas tight closures of the carton. The heat seal layer is a heat sealable olefin polymer. Preferably, the polymer is polyethylene, and most preferably, the polyethylene is low density polyethylene. The low density polyethylene has a coating weight of about sixteen pounds per ream.

The second tie layer is positioned immediately adjacent to and between the heat seal layer 40 and the skin coat layer. Like the first tie layer, the second tie layer functions to adhere together the two adjacent layers, namely the heat seal layer and the skin coat layer. This second tie layer, like the first tie layer, preferably, is made of Bynel E 388 which is sold by DuPont. However, the weight of the Bynel E 388 used in the second tie layer has a coating weight of about three (3) to about four (4) pounds per ream. In the second tie layer, Plexar 175 LDPE based tie layer resin can be substituted for Bynel E - 388. Plexar 175 is made by Quantum Corp.

Also, Bynel E 369 a modified low density polyethylene based adhesive resin made by DuPont can be used as the material for the second tie layer. It is preferred that Bynel E 369 be used as the second tie layer material if the skin coat layer is made of polyethylene terephthalate.

The skin coat layer is the innermost layer of the carton and, therefore, it contacts the beverage or food in the carton. This skin coat layer functions to prevent the migration of the essential oils and flavor components found in the beverage, or contents of the carton, into the polyethylene heat seal layer. Accordingly, the particular skin coat layer of the present barrier laminate 1 prevents the migration of the essential oils and flavor found in the beverage into the heat seal polyethylene layer of the laminate.

The skin coat layer is a very thin layer. The skin coat layer, preferably, is made of ethylene vinyl alcohol. However, the skin coat layer can be made of polyethylene terephthalate or nylon. The skin coat layer has a coating weight of about three (3) to about (4) pounds per ream.

As stated above, if the skin coat layer is made of polyethylene terephthalate, it is preferable that the second tie layer should be made of Bynel E 369.

The preferred skin coat layer material, namely ethylene vinyl alcohol, is not heat sealable. Therefore, the carton side flap, bottom flaps and top seals are formed by applying heat in the form of hot air and closing pressure so that the thin skin coat layer and the adjacent, thicker low density polyethylene layer become molten and flow together in such a manner that that portion of the skin coat layer 60 is diluted and does not interfere with the heat seal between the polyethylene heat seal layer 40 and the exterior, olefin polymer layer 5.

The exterior olefin polymer layer 5 preferably is made of polyethylene. In the most preferred embodiment, the polyethylene is low density polyethylene. The low density polyethylene layer 5, which is applied directly to the exterior surface of the substrate 10, provides a print surface for a graphics panel. As mentioned above, the polyethylene layer 5 additionally provides an outer heat seal medium for bonding the carton flaps together and enabling the top and bottom heat seals. The polyethylene layer 5 has a coating weight of about sixteen (16) pounds per ream.

Therefore, a typical carton made of the barrier laminate of the present invention should have a low density polyethylene outer layer 5 with a coating weight of about 16 pounds per ream, a bleached sulfate paperboard base layer with a coating weight of about 195 to about 280 pounds per ream, a nylon barrier layer with a coating weight of about 5 pounds per ream, a Bynel E - 388 first tie layer with a coating weight of about 3 to about 5 pounds per ream, a low density polyethylene heat seal layer with a coating weight of about 16 pounds per ream, a Bynel E - 388 second tie layer with a coating weight of about 3 to about 4 pounds per ream, and an ethylene vinyl alcohol skin coat layer with a coating weight of about 3 to about 4 pounds per ream.

By preventing the essential oils, such as D-limonene, from being absorbed into the low density polyethylene heat seal layer 40, the flavor components of the beverage do not change.

In addition, the present barrier laminate, by use of the heat seal coat layer 40, provides heat seal bonds that define the structure of the carton and provide liquid tight and gas tight closures. Thus, the present barrier laminate provides all the desired properties for a paperboard type beverage carton.

COMPARATIVE TESTS

In order to determine the effect of skin coat packaging on the retention of ascorbic acid and d-limonene in orange juice, a series of tests were carried out. Cartons in accordance with the invention were prepared differing only in their innermost or skin layer, the layer which in use would contact the beverage contents. Cartons corresponding to the conventional polyethylene carton (supra) were also prepared.

The conventional test methods for carrying out the studies and the analytical procedures were used.

Orange juice, filled at an operational juice plant, was packaged and stored in the following half gallon containers for 8 weeks:
1. Regular PE
2. Invention/EVOH
3. Invention/NYLON
4. Invention/PET Results and Discussion The results discussed below ar confined mainly to the first six weeks. After that time, the presence of mold and other microbial growth would be a factor influencing the continued degradation of the orange juice. Mold was observed after six weeks, much of the observed mold being located on carton seams where oxygen would have encouraged growth. Microbial growth was likely to have been present several days before physical observation thereof.

D-LIMONENE:

Invention/PET and Invention/EVOH

The orange juice contained in these cartons retained close to 100% of d-limonene, which is characteristic of non-scalping polymers.

Invention/NYLON

The orange juice contained in these cartons lost about 8-9% d-limonene by week 2, after which time it seemed to stabilize at about 91% retention.

PE

The orange juice in the regular PE cartons continued a downward loss of d-limonene. At week 6, retention was less than 60%.

ASCORBIC ACID

Invention/EVOH and Invention/NYLON

The orange juice in these cartons showed similar trends in the loss of Ascorbic acid. By week 6 both of these cartons had maintained approximately 78% retention.

Invention/PET

This carton showed a slightly lower percent retention than the other structures. At week 6 ascorbic acid retention was 70%. It was observed that the PET cartons had poor side, top and bottom seams, which may have allowed for greater oxidation of ascorbic acid.

PE

Orange juice in the regular PE carton showed a continued drop in Ascorbic Acid retention weekly. At week 6 the ascorbic acid retention was only 25%.

Following week 6, the effect of microbial growth in the juice may have contributed to the decrease in ascorbic acid retention.

The averaged data from the chemical analysis is presented below:

TABLE II

| SAMPLE | WEEK | % ASCORBIC ACID RETENTION | | | | | | | |
|---|---|---|---|---|---|---|---|---|---|
| | 0 | 1 | 2 | 3 | 4 | 5 | 6 | 7 | 8 |
| PE | 100.0 | 86.67 | 75.85 | 62.85 | 53.13 | 40.92 | 24.77 | 10.77 | 7.96 |
| EVOH | 100.0 | 93.52 | 88.95 | 89.40 | 81.21 | 80.00 | 78.92 | 71.31 | 71.50 |
| NYLON | 100.0 | 93.76 | 87.56 | 88.37 | 80.02 | 80.97 | 77.77 | 69.67 | 70.46 |
| PET | 100.0 | 92.17 | 85.77 | 84.97 | 77.51 | 76.61 | 70.18 | 63.33 | 62.98 |

TABLE I

| SAMPLE | WEEK | % D-LIMONENE RETENTION | | | | | | | |
|---|---|---|---|---|---|---|---|---|---|
| | 0 | 1 | 2 | 3 | 4 | 5 | 6 | 7 | 8 |
| PE | 100.0 | 91.18 | 77.65 | 73.53 | 68.24 | 60.35 | 57.65 | 47.06 | 49.76 |
| EVOH | 100.0 | 100.00 | 100.00 | 100.00 | 100.00 | 100.00 | 100.00 | 100.00 | 100.00 |
| NYLON | 100.0 | 96.67 | 91.11 | 92.22 | 92.78 | 93.33 | 93.33 | 86.67 | 86.22 |
| PET | 100.0 | 100.00 | 100.00 | 100.00 | 100.00 | 100.00 | 100.00 | 100.00 | 100.00 |

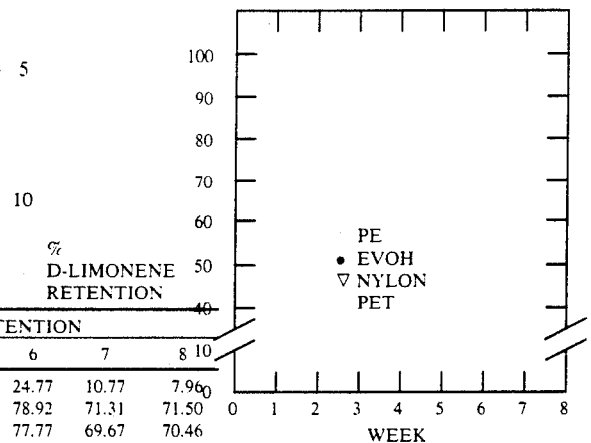

TABLE II

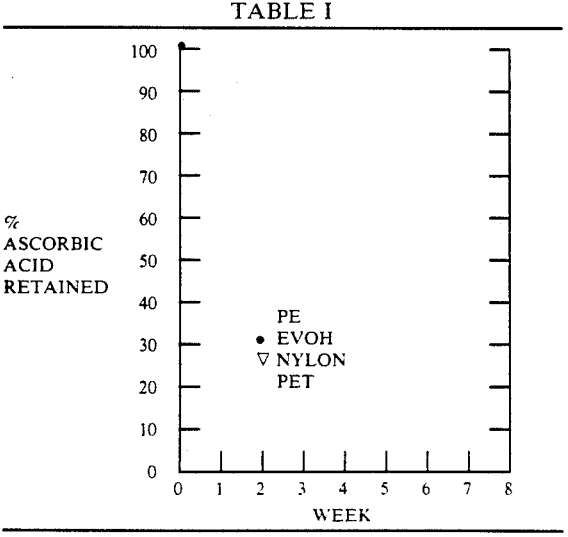

TABLE I

SUMMARY

Orange juice contained in various skin coat cartons was chemically analyzed for retention of ascorbic acid and d-limonene over an eight week period. Orange juice packaged in cartons in accordance with the invention retained approximately 75% of its ascorbic acid content through week six. Orange juice packaged in EVOH and PET skin coat cartons retained 100% of the d-limonene content through week 8. The regular polyethylene juice carton was shown to be an inferior structure for retention of either ascorbic acid or d-limonene.

While the invention has been illustrated and described as embodied in an improved barrier laminate for containment of flavor, essential oils and vitamins, it is not intended to be limited to the details shown, since various modifications and structural changes may be made without departing in any way from the spirit of the present invention.

Wherefore, we claim:

1. A barrier laminate comprising:
   a paperboard substrate having a first surface and a second surface, the second surface being opposite the first surface;
   a nylon barrier layer applied directly on the first surface of the paperboard substrate;
   a first tie layer of modified polyethylene applied directly onto the nylon barrier layer;
   a heat seal layer of low density polyethylene applied directly onto the first tie layer, wherein the first tie layer adheres together the nylon barrier layer and the low density polyethylene heat seal layer;

a second tie layer applied directly onto the low density polyethylene heat seal layer, said second tie layer being a low density polyethylene based tie layer resin; and a skin coat layer applied directly onto the second tie layer, said skin coat layer being a member selected from the group consisting of ethylene vinyl alcohol, polyethylene terephthalate and nylon, and wherein said second tie layer is either low density polyethylene based resin or modified polyethylene resin when the skin coat layer is either ethyl vinyl alcohol or nylon, and wherein said second tie layer is modified low density polyethylene resin when said skin coat layer is polyethylene terephthalate.

2. The barrier laminate of claim 1, wherein the paperboard substrate is a bleached sulfate paperboard.

3. The barrier laminate of claim 1, further comprising a layer of polyethylene being applied directly onto the second surface of the substrate.

4. The barrier laminate of claim 3, wherein the paperboard substrate has a coating weight of about one hundred and ninety-five to about two hundred and eighty pounds per ream, and wherein the nylon barrier layer has a coating weight of about five pounds per ream, and wherein the first tie layer of modified polyethylene has a coating weight of about three to about five pounds per ream, and wherein the second tie layer has a coating weight of about three to about four pounds per ream, and wherein the skin coat layer has a coating weight of about three to about four pounds per team, and wherein the low density polyethylene layer applied onto the second surface of the paperboard substrate has a coating weight of about sixteen pounds per ream.

5. A beverage carton made from the barrier laminate of claim 4.

6. A beverage carton made from the barrier laminate of claim 1.

* * * * *